United States Patent [19]

Evans

[11] Patent Number: 4,660,122

[45] Date of Patent: Apr. 21, 1987

[54] FOLDBACK CURRENT LIMITING CIRCUIT

[75] Inventor: Thomas E. Evans, Parker, Colo.

[73] Assignee: Honeywell Inc., Minneapolis, Minn.

[21] Appl. No.: 655,268

[22] Filed: Sep. 28, 1984

[51] Int. Cl.$^4$ .............................................. H02H 9/04
[52] U.S. Cl. ...................................... 361/90; 361/18; 323/276
[58] Field of Search ................... 323/276, 280; 361/18, 361/78, 86, 88, 90; 330/85; 307/154, 155

[56] References Cited

U.S. PATENT DOCUMENTS 4,167,777 9/1979 Allington .............................. 363/79
4,530,026 7/1985 Noro ..................................... 361/88

Primary Examiner—A. D. Pellinen
Assistant Examiner—H. L. Williams
Attorney, Agent, or Firm—Charles L. Rubow

[57] ABSTRACT

A current limiting device that, with increases of input voltage, the current increases to a first value and, as the input voltage increases further, the current decreases to a second value so as to protect any of a plurality of loads that may be used therewith.

2 Claims, 3 Drawing Figures

FOLDBACK CURRENT LIMITING CIRCUIT

BACKGROUND OF THE INVENTION

In order to protect delicate components in some electronic circuits, current limiting devices are employed to prevent the flow of current to the components from exceeding some predetermined damaging value. These devices operate to hold the current to the components below a harmful value in the event of some circuit malfunction or abnormal situation.

It is sometimes desirable to be able to change one delicate component for another having a different damaging current limit. For example, a circuit for supplying a 120 ohm strain gauge might normally operate at about 42 milliamps of current at an operating voltage of about 5 volts, and might permit 50 milliamps of current to flow to the strain gauge without damage to the gauge. However, if a 350 ohm strain gauge which normally operated at about 29 milliamps of current at an operating voltage of about 10.00 volts were substituted in the same circuit, the gauge might be damaged or destroyed by a current flow of 50 milliamps. A prior art current limiting device could be used, to hold the 50 milliamps maximum current value in the event of a malfunction, which would protect the 120 ohm strain gauge. However, the same current limiting device would permit damage to the alternative 350 ohm strain gauge. Of course, a different current limiting device could be substituted for each load change, but this is costly and undesirable. Accordingly, prior art current limiting circuits are not desirable when used in connection with interchangeable load components.

The present invention provides a current limiting circuit which will prevent damaging current from flowing to delicate devices such as strain guages and still permit interchanging of such devices while, at the same time, providing a very accurate source of voltage for these delicate components.

SUMMARY

The present invention is a current limiting circuit which supplies various accurate voltage values to each of a plurality of interchangeable components and which allows appropriate currents to flow to these components up to a predetermined value and then, after the predetermined value is reached, starts decreasing or folding back the current to the components so that it reaches a completely safe value for any of the interchangeable components. This is accomplished, in the preferred embodiment, with a novel circuit between the power supply and the components which includes a high gain differential amplifier having one terminal connected to an accurate source of reference voltage, the other input connected to the load and an output connected in a novel feedback arrangement to the input to produce an accurate voltage source which maintains the voltage to the load at substantially the reference voltage. In the preferred embodiment, a pair of diodes are connected in the forward path so that a current flows in one or the other or neither depending on the applied voltage and thus, a circuit which operates in three separate modes is provided. In the first mode, when the voltage to the load changes, the applied voltage at the output of the differential amplifier changes in a direction such as to bring the load voltage back to the reference voltage value. This may cause the applied voltage at the input of the amplifier to vary anywhere from a first value to a second value for normal operation. Of course, variation in the applied voltage causes the current to the component to increase from a first value to a second value in substantially a straight line fashion but only for the brief period of time necessary to return the voltage to the load back to the reference voltage. If certain malfunctions occur, however, the output of the amplifier will not be able to cause rebalance and the applied voltage will continue to increase. Very quickly this voltage would reach a level that would produce a damaging current to the load. However, in the present invention, before this happens, the second and third modes of operation occur which produce a foldback of the current to a safe level. More particularly, when the applied voltage reaches a level substantially equal to the voltage drop across the first diode, the second mode of operation occurs so that with further increases in voltage, the current is held to a fixed value. With a runaway applied voltage, the second mode does not last long because the applied voltage quickly increases to a third value which is greater than the voltage drop across the second diode. At this point, the third mode of operation takes over and the current to the components begins decreasing with further applied voltage increases and falls to a safe value that will protect any of the alternate components. Thus, if a malfunction occurs in the circuit which causes a runaway increase in voltage to occur, the increase in voltage can only proceed to a certain high value for a short period of time after which any further increases in voltage cause the current to decrease to a safe level.

DETAILED DESCRIPTION OF THE PREFERRED EMBODIMENTS

Figure 1:
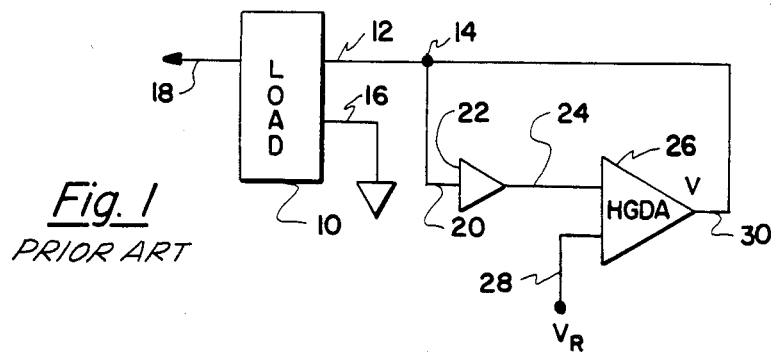
FIG. 1 shows a system with a feedback circuit which is unprotected by the use of the present invention.

In FIG. 1 a load 10, which may be any one of several interchangeable delicate devices such as strain gauges, is shown having a first supply input lead 12 connected to a junction point 14. Load 10 is shown having a ground connection 16 and an output connection 18 for simplicity in explaining the present invention. In normal practice, it should be understood that strain gauges are more commonly connected in bridge circuits and there would commonly be a negative but substantially identical portion of the bridge connected between ground and a negative input lead. As the forces on the strain gauge change, the output voltage on connection 18 changes by an amount dependent on the resistance of the strain gauge. Because the load is delicate and requires high accuracy input voltages, it is desirable that the voltage on lead 12 and junction 14 be maintained at an accurate value. This voltage may increase and decrease for short periods of time but is rapidly returned to the nominal supply voltage.

In order to maintain the voltage at junction point 14 accurately constant, a connection 20 is made therefrom to a buffer amplifier 22 whose gain may equal unity and whose output is connected to a first input terminal 24 of a high gain differential amplifier 26. The other input terminal to the high gain differential amplifier 26 is shown connected by conductor 28 to a highly accurate source of reference voltage $V_R$. Any difference between the voltages on conductors 24 and 28 will cause the differential amplifier 26 to produce an output signal V on a conductor 30 which is shown connected back to junction point 14. This feedback circuit causes the voltage at junction point 14 to be maintained at a stable fixed value since any change in voltage at junction point 14 wil cause a change in voltage through buffer amplifier 22 to conductor 24, and thus present a difference signal between conductors 24 and 28 to the high gain differential amplifier 26 which will then produce a change in voltage V on conductor 30 to bring the voltage at junction point 14 back to its desired value.

The difficulty with the circuit of FIG. 1 can be seen when a malfunction occurs. For example, if the conductor between junction point 14 and buffer amplifier 22 were to separate or open, then the rebalance signal would not reach the high gain differential amplifier 26, and the output from this amplifier on conductor 30 would drive the voltage at junction point 14 and on input 12 to a value which could damage or destroy the delicate load 10.

Accordingly, it is desirable to have some sort of current limiting device between the output of the high gain differential amplifier 26 and the input 12 so that in the event of a malfunction as described above, the current to the load 10 cannot exceed a certain predetermined value. Many such current limiting devices are available in the market, but the difficulty with them arises because they hold the current to less than only one preselected value. This may be satisfactory for a particular load 10, but when alternative loads are substituted with different impedances, the current value held by the prior art device may be too high and may damage the load.

Figure 2:
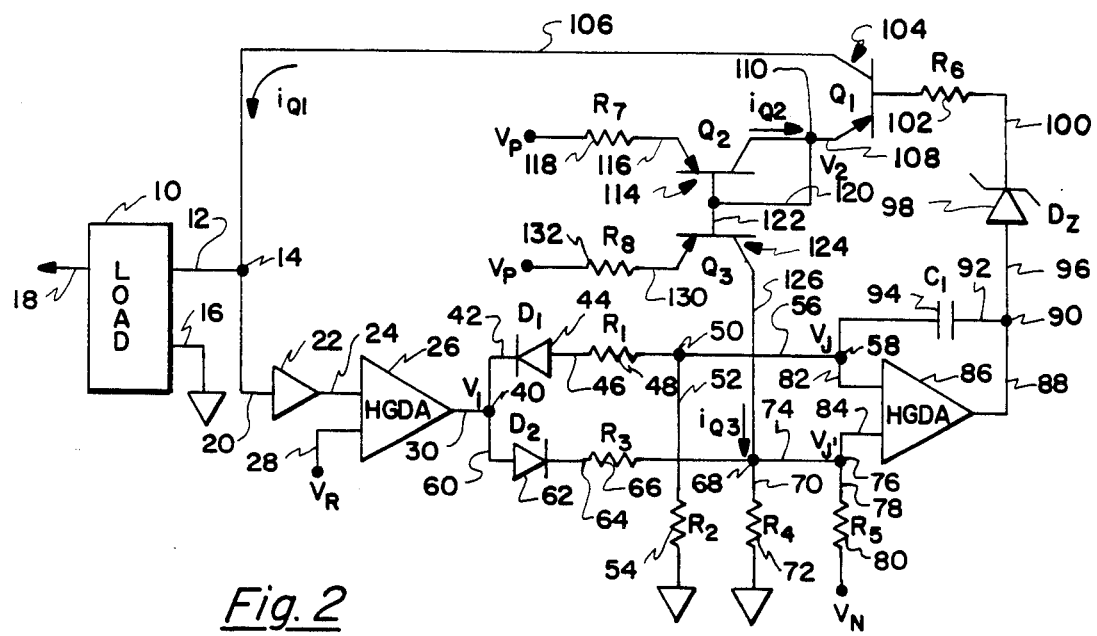
FIG. 2 shows the present invention in schematic diagram form.

The system of FIG. 2 includes a current limiting circuit connected between the output of a high gain differential amplifier 26 as shown in FIG. 1 and the input to load 10. This circuit operates to control the current at the output of amplifier 26 in such a way that, should the voltage at the output of the amplifier increase beyond the normal operating range, the current will "foldback" or, in other words, start decreasing so as to prevent damage to any of the delicate loads which may be used.

In FIG. 2 elements which are the same as in FIG. 1 will be given the same reference numerals. As in FIG. 1, the load 10 in FIG. 2 has an input 12 connected to a junction point 14. A ground connection 16 is shown and the output from load 10 is shown on a conductor 18. Junction point 14 is connected by a conductor 20 to a buffer amplifier 22 whose output is connected by conductor 24 to high gain differential amplifier 26 which has a second input connected by a conductor 28 to a highly accurate source of reference voltage $V_R$. Amplifier 26 is shown having an output $V_1$ on a conductor 30 connected to a junction point 40. Junction point 40 is shown connected by a conductor 42 to a first diode $D_1$ indicated by reference numeral 44. Diode 44 is poled so as to permit current flow towards junction point 40. The other side of diode 44 is connected by a conductor 46 through a resistor $R_1$ indicated by a reference numeral 48 to a junction point 50. Junction point 50 is connected by a conductor 52 through a resistor $R_2$ indicated by reference numeral 54 to ground. Junction point 50 is also connected by a conductor 56 to a junction point 58.

Junction point 40 is likewise connected by a conductor 60 to a second diode $D_2$ indicated by reference numeral 62. Diode 62 is poled so as to permit current flow away from junction point 40. The other side of diode 62 is connected by a conductor 64 through a resistor $R_3$ indicated by reference numeral 66 to a junction point 68. Junction point 68 is connected by a conductor 70 through a resistor $R_4$ indicated by reference numeral 72 to ground. Junction point 68 is also connected by a conductor 74 to a junction point 76 which is connected by a conductor 78 through a resistor $R_5$ indicated by reference numeral 80 to a source of negative reference voltage $V_N$.

Junction points 58 and 76 are shown having input voltages $V_j$ and $V_j$, thereon, respectively, and are connected by conductors 82 and 84 respectively to the two inputs of a second high gain differential amplifier 86. Differential amplifier 86 has an output connected by a conductor 88 to a junction point 90 which, by a conductor 92, is connected through a capacitor $C_1$ indicated by reference numeral 94 back to junction point 58. Junction point 90 is also connected by a conductor 96 to a Zener diode $D_Z$ indicated by reference numeral 98. Zener diode 98 is poled so as to permit current flow away from junction point 90. The other side of Zener diode 98 is connected by conductor 100 through a resistor $R_6$ indicated by reference numeral 102 to the base of a first PNP transistor $Q_1$ indicated by reference numeral 104. The collector terminal of transistor 104 is connected by a conductor 106 back to junction point 14 to supply the current $i_{Q1}$ to load 10.

Transistor 104 has an emitter electrode connected by conductor 108 to a junction point 110 which is, in turn, connected to the collector electrode of a second PBP transistor $Q_2$ indicated by reference numeral 114. The collector electrode of transistor 114 supplies a current $i_{Q2}$. The emitter electrode of transistor 114 is connected by a conductor 116 through a resistor $R_7$ indicated by reference numeral 118 to a source of positive supply voltage $V_p$. The base of transistor 114 is connected by a conductor 120 to junction point 110 and by a conductor 122 to the base of a third PNP transistor $Q_3$ indicated by reference numeral 124. The collector of transistor 124 is connected by a conductor 126 to junction point 68 and supplies a current $i_{Q3}$. The emitter of transistor 124 is connected by a conductor 130 through a resistor $R_8$ indicated by reference numeral 132 to the source of positive supply voltage $V_p$.

OPERATION OF THE CIRCUIT OF FIG. 2

Figure 3:
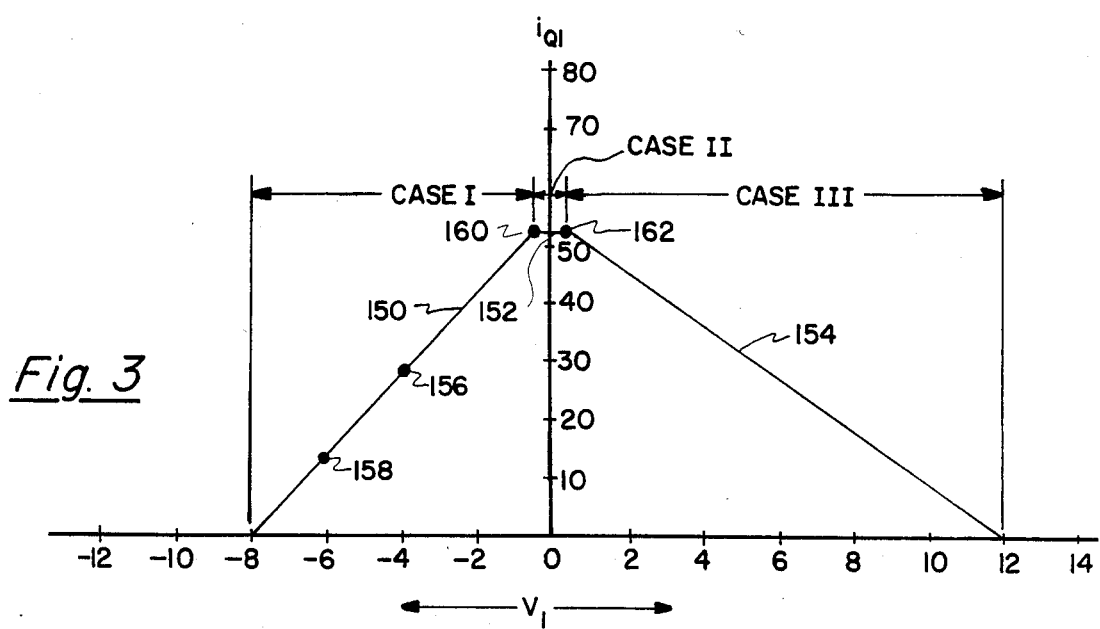
FIG. 3 shows the variation of current to the load with increases of voltage.

To understand the operation of FIG. 2, reference should first be had to FIG. 3 which shows the variation of the current $i_{Q1}$, the current flowing into junction point 14 from the collector of transistor 104, with changes in voltage $V_1$ at junction point 40.

In normal operation, referred to herein as case I, and with the component values listed in the chart hereafter, the voltage $V_1$ may vary between about a minus 10 volts and approximately $-0.75$ volts, the voltage drop across diode 44. During the excursion from $-10$ to $-0.75$ volts, the current $i_{Q1}$ will go from approximately 0 milliamps up to approximately 52 milliamps along a first portion of the curve indicated by reference numeral 150. 52 milliamps may be somewhat higher current than the strain gauges used in load 10 could tolerate over an extended period of time, but because the feedback is very swift, and current change from a nominal value for the particular strain gauge in use is of very short duration, the current will not damage the load. On the other hand, if a malfunction were to occur as set forth with regard to FIG. 1, the voltage $V_1$ would continue to increase to a higher value and for a longer period of time and could cause damage. In order to prevent this, the current is caused to foldback after the voltage $V_1$ exceeds the approximately 0 volt limit. More particularly, when the voltage reaches $-0.75$ volts, the current $i_{Q1}$ stays at the value of about 52 milliamps for a small range of voltages shown in FIG. 3 as the portion of the curve indicated by reference numeral 152 and referred to herein as case II. Then, as the voltage $V_1$ increases to about $+0.75$, the voltage drop across diode 62 and into the positive region, the current $i_{Q1}$ folds back and decreases along the portion of the curve indicated by reference numeral 154, herein referred to as case III. A final low value of around 5 milliamps is reached at the saturation limit of amplifier 26. Strain gauge resistances which can be used with the present invention are from about 120 ohms to about 10,000 ohms although 120 ohms to 350 ohms are most common. The final current of 5 milliamps will not harm any of these loads.

The portion of the curve indicated by reference numeral 150, case I, will contain the operating points of all of the strain gauges expected to be used. For example, if a 120 ohm load is used, the normal operating point might be at point 156 on curve portion 150, i.e., an $i_{Q1}$ of 28 milliamps and a $V_1$ of $-4$ volts for $V_1$. With a 350 ohm load the normal operating point might be at point 158, i.e., the current $i_{Q1}$ at about 12 milliamps and the voltage $V_1$ at about $-6$ volts. Then as $V_1$ changed about the normal operating point, the current $i_{Q1}$ might go higher than the desired value, but only for a short period of time. It is only when $V_1$ goes beyond its upper limit (when $D_1$ stops conducting) that further increases therein will cause the current to drop off to a safe value. As will be explained, the plateau region 152 of the curve of FIG. 3, case II, is not required, but occurs because of the use of diodes 44 and 62 which each inherently have a small voltage drop thereacross, in the neighborhood of 0.75 volts each. If other means were employed, the horizontal portion 152 of the curve could be eliminated and the invention would still operate to protect the loads.

The circuit of FIG. 2 accomplishes the current limiting according to the curve of FIG. 3 by dividing the operation of the circuit into three cases, the first of which is where the voltage $V_1$ is less than $-V_D$, the negative of the forward voltage across diode $D_1$, the second of which is where $-V_D$ is less than $V_1$ which in turn is less than $+V_D$, the positive forward voltage drop across diode $D_2$ and the third of which is where $+V_D$ is less than $V_1$. In FIG. 3, case 1 is shown by the portion 150 of the curve, case 2 is shown by the portion 152 of the curve, and case 3 is shown by the portion 154 of the curve. The junction point 160 between portions 150 and 152 occurs at a voltage just to the left of 0 in FIG. 3, and is representative of the negative voltage $V_D$ across diode $D_1$, about $-0.75$ volts. Likewise, the junction point 162 between portions 152 and 154 occurs just to the positive side of 0 and is representative of the positive voltage drop $V_D$ across diode $D_2$, about $+0.75$ volts.

Considering case I where $V_1$ is less than $-V_D$, the voltage $V_j$ at junction point 58, which is the upper input terminal to the high gain differential amplifier 86, can be expressed as follows:

$$V_J = \frac{(V_1 + V_D)}{R_1 + R_2}(R_2) \quad (1)$$

and the voltage $V_j$, the voltage at junction point 76 and the lower input to the high gain differential amplifier 86 can be expressed as follows:

$$V_{j'} = V_T + i_{Q3}R_T \quad (2)$$

where $V_T$ is the Thevenin equivalent voltage given by the equation:

$$V_T = V^N \frac{R_4}{R_4 + R_5} \quad (3)$$

$R_T$ is the Thevenin equivalent resistance and is given by the equation:

$$R_T = \frac{R_4 R_5}{R_4 + R_5} \quad (4)$$

and $i_{Q3}$ is the current from the collector of transistor Q3 to junction point 68 and is given by the equation:

$$i_{Q3} = \frac{V_P - (V_2 + V_{Q3EB})}{R8} \times \frac{B_3}{B_3 + 1} \quad (5)$$

where $V_2$ is the voltage at junction point 110 (and base of transistor $Q_3$), $V_{Q3EB}$ is the voltage between the emitter and base of transistor $Q_3$ and $B_3$ is the current gain of transistor $Q_3$.

Since the high gain differential amplifier 86 operates to hold the two voltages at its input substantially equal by virtue of the feedback path including conductor 92 and capacitor 94, then $V_j$ is substantially equal to $V_{j'}$ and from equations (1), (2), and (5):

$$\frac{(V_1 + V_2)R_2}{R_1 + R_2} = V_T + \frac{B_3(V_P - V_2 - V_{Q3EB})R_T}{(B_3 + 1)R8} \quad (6)$$

Solving equation (6) for $V_2$ the following expression is derived:

$$V_2 = V_P - V_{Q3EB} - \frac{(B_3 + 1)}{B_3} \times \frac{R_3}{R_T} \times \quad (7)$$

$$\left[ \frac{(V_1 + V_D)R_2}{R_1 + R_2} - V_T \right]$$

From FIG. 2 the current to the load $i_{Q1}$ is the collector current from transistor Q1 and may be expressed as follows:

$$i_{Q1} = \frac{B_1}{B_1 + 1} \times i_{Q2} \quad (8)$$

Wherre $B_1$ is the current gain for transistor $Q_1$ and $i_{Q2}$ is the collector current for transistor $Q_2$ which is also the emitter current for transistor $Q_1$. In similar fashion, the value of $i_{Q2}$ is given by the following:

$$i_{Q2} = \frac{B_2}{B_2 + 1} \times \frac{V_P - (V_2 + V_{Q3EB})}{R_7} \quad (9)$$

Where $V_{Q2EB}$ is the emitter-base voltage for transistor $Q_2$ and $B_2$ is the current gain for transistor $Q_2$.

Substituting the value for $V_2$ as found in equation (7) into equation (9), the following equation for $i_{Q1}$ results:

$$i_{Q1} = \frac{B_1}{B_1 + 1} \times \frac{B_2}{B_2 + 1} \times \frac{B_3 + 1}{B_3} \times \frac{R_8}{R_7 R_T} \times \quad (10)$$

$$\left[ \frac{(V_1 + V_D)R_2}{R_1 + R_2} - V_T \right]$$

Equation (10) is the working equation for the current $i_{Q1}$ for case I where $V_1$ is less than $-V_D$. It should be noticed that in equation (10) the current $i_{Q1}$ is completely independent of the positive voltage supply $V_P$ so that any minor variations in the latter will have no effect on the current to the load. From equation (10) $i_{Q1}$ will vary with $V_1$ along the curve portion 150 in FIG. 3 if the values for the resistors and voltage sources are as indicated in the chart of component values given below.

When the voltage $V_1$ increases to a value $-0.75$ volts which is equal to the forward voltage drop $V_D$ across diode $D_1$ then current will no longer flow through diode $D_1$ in FIG. 2. Furthermore, until the voltage $V_1$ increases to a value of $+0.75$ volts which is equal to the forward voltage $V_D$ across diode $D_2$, current will also not flow through the diode $D_2$. During this interval where $-V_D$ is less than $V_1$ and $V_1$ is less than $+V_D$, the voltage $V_j$ in FIG. 2 will be 0 and the voltage $V_{j'}$ will be the same as it was in case I, i.e., that given by equation (2) above. Again, since at balance $V_j$ equals $V_{j'}$, equation (6) above becomes:

$$0 = V_T + \frac{B_3(V_P - V_2 - V_{Q3EB})R_T}{(B_3 + 1)R_8} \quad (11)$$

The expression for $V_2$ in case II becomes:

$$V_2 = V_P - V_{Q3EB} + \frac{(B_3 + 1)R_8}{B_3 R_T} \times V_T \quad (12)$$

Again the expression for $i_{Q1}$ and $i_{Q2}$ are given by the equations (8) and (9) above, and, accordingly, substituting the equation for $i_{Q2}$ from equation (9) and the equation for $V_2$ from equation (12) into equation (8), the following equation for $i_{Q1}$ is derived for case II:

$$i_{Q1} = -\frac{B_1}{B_1 + 1} \times \frac{B_2}{B_2 + 1} \times \frac{B_3 + 1}{B_3} \times \frac{R_8}{R_7 R_T} \times V_T \quad (13)$$

Equation (13) is the working equation for the circuit during the period when the voltage $V_1$ lies between the voltage drops $V_D$ and $+V_D$ for diodes $D_1$ and $D_2$ in FIG. 2. It should be noted that the current $i_{Q1}$ is again independent of the positive supply voltage $V_P$ and that $i_{Q1}$ is a fixed value represented by the curve portion 152 in FIG. 3.

When the voltage $V_1$ becomes greater than the voltage drop $V_D$ across diode $D_2$, then case III occurs wherein current will flow through diode $D_2$ but not through diode $D_1$. In this event, the voltage $V_J$ will again equal 0 but now the voltage $V_{j'}$ will be given by the equation:

$$V_{j'} = \frac{R_3 + R_T}{R_3 R_T} \times \left[ i_{Q3} + \frac{V_1 - V_D}{R_3} + \frac{V_T}{R_T} \right] \quad (14)$$

And again because $V_j$ equals $V_{j'}$, we obtain the expression:

$$0 = \frac{B_3}{B_3 + 1} \times \frac{V_P - V_2 - V_{Q3EB}}{B_3} + \frac{V_1 - V_D}{R_3} + \frac{V_T}{R_T} \quad (15)$$

Solving this equation for $V_2$ we obtain:

$$V_2 = V_P - V_{Q3EB} + \frac{R_3(B_3 + 1)}{B_3} \times \left[ \frac{V_1 - V_D}{R_3} + \frac{V_T}{R_T} \right] \quad (16)$$

Again equations (8) and (9) are applicable to case III and accordingly substituting equation (16) into equation (9) the following equation is obtained:

$$i_{Q1} = \frac{-B_1}{B_1 + 1} \times \frac{B_2}{B_2 + 1} \times \frac{B_3 + 1}{B_3} \times \quad (17)$$

$$\frac{R_8}{R_7} \times \frac{V_1 - V_D}{R_3} + \frac{V_T}{R_T}$$

Equation (17) is the working equation for the current to the load in the case III where the voltage $V_1$ has increased in a positive direction past the point representing the voltage drop across diode $D_2$. It is seen that again $i_{Q1}$ is independent of the positive supply $V_P$, and that the current will decrease with increases of $V_1$ as is shown by the curve portion 154 in FIG. 3.

The following is a chart of the component values used in the preferred embodiment of the present invention:

| Component | Value |
|---|---|
| $R_1$ | 1.82k ohms |
| $R_2$ | 10k ohms |
| $R_3$ | 20k ohms |
| $R_4$ | 20k ohms |
| $R_5$ | 20k ohms |
| $R_6$ | 100 ohms |
| $R_7$ | 4.22k ohms |
| $R_8$ | 49.9 ohms |
| $C_1$ | 470 picofarads |
| $V_P$ | 12.75 volts |
| $V_N$ | −12.75 volts |
| $V_{D1}$ and $V_{D2}$ | 0.75 volts |
| $V_T$ | −6.375 volts |
| $D_1$ | 1N4148 |
| $D_2$ | 1N4148 |
| $Q_1$ | MPSU51A |
| $Q_2$ | 2N3906 |
| $Q_3$ | 2N3906 |
| $B_1$ | 55 |
| $B_2$ | 60 |
| $B_3$ | 80 |

It is, therefore, seen that I have provided a circuit which will supply an accurate source of voltage to a load, and will protect a number of different sized loads from malfunctions that would result in a damaging increased current to the load. Many changes to the preferred embodiment will occur to those skilled in the art. For example, as mentioned above, strain gauges connected in a bridge might use two of the circuits as described herein, one for each of the two halves of the bridge the second reference voltage being negative rather than positive. Also, other loads than strain gauges can be protected with the invention described herein. Likewise, a voltage sensitive switch may be employed in place of diodes $D_1$ and $D_2$ and the horizontal portion 152 of the curve of FIG. 3 eliminated.

Accordingly, I do not wish to be limited to the specific disclosures used in connection with describing the preferred embodiment. I intend only to be limited by the following claims.

I claim:

1. Electric current supply apparatus including a current limiting circuit for protecting interchangeable loads having different impedances, the current supply apparatus comprising:

a supply terminal adapted to be connected to any of a plurality of interchangeable loads;

first amplifier means having a first input terminal connected to said supply terminal, a second input terminal connected to a reference source of voltage and an output terminal upon which a first voltage indicative of the voltage difference between the first and second input terminals is produced;

second amplifier means having first and second input terminals and an output terminal upon which is produced a voltage indicative of the difference between the voltages at the first and second input terminals thereof;

means connecting the output terminal of said second amplifier means to said supply terminal; and switching means having first and second current paths between the output terminal of said first amplifier means and the first and second input terminals of said second amplifier means respectively, said switching means being operable when the first voltage is within a first range of values to supply current only through the first current path, and operable when the first voltage is within a second range of values to supply current only through the second current path, said second amplifier means providing a current at its output terminal which varies directly with the first voltage when current is being supplied through the first current path, and providing a current which varies inversely with the first voltage when current is being supplied through the second current path, said second amplifier means operating to limit the current to said supply terminal to a value which protects any of the interchangeable loads.

2. Apparatus according to claim 1 wherein said switching means comprises first and second diodes oppositely poled and connected at a junction with the junction being connected to the output terminal of said first amplifier means.

* * * * *